(12) United States Patent
Guarise et al.

(10) Patent No.: US 12,465,596 B2
(45) Date of Patent: Nov. 11, 2025

(54) STABILISATION AND CONTROLLED-RELEASE SYSTEMS FOR MEDICAMENTS UNSTABLE ON STERILISATION

(71) Applicant: FIDIA FARMACEUTICI S.P.A., Abano Terme (IT)

(72) Inventors: Cristian Guarise, Abano Terme (IT); Carlo Pizzocaro, Abano Terme (IT)

(73) Assignee: FIDIA FARMACEUTICI S.p.A., Abano Terme (IT)

( * ) Notice: Subject to any disclaimer, the term of this patent is extended or adjusted under 35 U.S.C. 154(b) by 1091 days.

(21) Appl. No.: 17/440,396

(22) PCT Filed: Jan. 28, 2020

(86) PCT No.: PCT/IB2020/050636
§ 371 (c)(1),
(2) Date: Sep. 17, 2021

(87) PCT Pub. No.: WO2020/188365
PCT Pub. Date: Sep. 24, 2020

(65) Prior Publication Data
US 2022/0241251 A1     Aug. 4, 2022

(30) Foreign Application Priority Data
Mar. 18, 2019   (IT) .................. 102019000003887

(51) Int. Cl.
| | | |
|---|---|---|
| A61K 31/436 | (2006.01) |
| A61K 9/107 | (2006.01) |
| A61K 31/202 | (2006.01) |
| A61K 31/22 | (2006.01) |
| A61K 31/337 | (2006.01) |
| A61K 31/495 | (2006.01) |
| A61K 31/573 | (2006.01) |
| A61K 38/23 | (2006.01) |
| A61K 47/18 | (2017.01) |
| A61K 47/36 | (2006.01) |
| A61P 19/02 | (2006.01) |

(52) U.S. Cl.
CPC .......... *A61K 31/436* (2013.01); *A61K 9/1075* (2013.01); *A61K 31/202* (2013.01); *A61K 31/22* (2013.01); *A61K 31/337* (2013.01); *A61K 31/495* (2013.01); *A61K 31/573* (2013.01); *A61K 38/23* (2013.01); *A61K 47/18* (2013.01); *A61K 47/36* (2013.01); *A61P 19/02* (2018.01)

(58) Field of Classification Search
CPC .............................. A61K 31/436; A61P 19/02
See application file for complete search history.

(56) References Cited

FOREIGN PATENT DOCUMENTS

| CN | 105820270 A | * | 8/2016 | .......... A61K 9/1075 |
| WO | WO 2018/092013 A1 | | 5/2018 | |

OTHER PUBLICATIONS

CN105820270 A Machine translation (Year: 2016).*
International Search Report, issued in PCT/IB2020/050636, dated May 26, 2020.
Written Opinion of the International Searching Authority, issued in PCT/IB2020/050636, dated May 26, 2020.

* cited by examiner

*Primary Examiner* — Sarah Pihonak
*Assistant Examiner* — Mikhail O'Donnel Robinson
(74) *Attorney, Agent, or Firm* — Birch, Stewart, Kolasch & Birch, LLP (57) ABSTRACT

Disclosed are alkenylamides of sulfated hyaluronic acid and their use for the stabilisation and release of medicaments in the form of micellar suspensions which can be administered locally and/or locoregionally, in particular intra-articularly.

13 Claims, 3 Drawing Sheets

STABILISATION AND CONTROLLED-RELEASE SYSTEMS FOR MEDICAMENTS UNSTABLE ON STERILISATION

The present invention relates to alkenylamides of sulfated hyaluronic acid and their use for the stabilisation and release of medicaments in the form of micellar suspensions which can be administered locally and/or locoregionally, in particular intra-articularly.

State of the Art

Local or locoregional administration is being increasingly studied to overcome the problems associated with the systemic toxicity or pharmacokinetics of medicaments; the possibility of making a medicament available at its site of operation would reduce the doses administered, further decreasing the likelihood of side effects. This advantage is particularly important in the treatment of chronic disorders requiring continuous administration or disorders which are etiologically and biochemically complex. One of the most significant examples of said disorders is osteoarthrosis (OA), which results from a complex system of mechanical and biochemical interactions whose end result is deterioration of joint tissue. Although the initial damage mechanism is largely unknown, the modifications caused to the cartilage, and subsequently to the subchondral bone, are known, such as a reduction in aggrecan and proteoglycan content in the joint cartilage, an increase in type I (subchondral) collagen compared with type II (present in hyaline cartilage), imbalances of the metabolic and catabolic activity of the chondrocytes and massive imbalances of intra-articular enzymatic activity, with over-expression of (inter alia) metalloproteinases, cytokines and inflammatory enzymes. All this leads to cracking of the intra-articular cartilage, initially superficial and then affecting the entire thickness of the cartilage until, in the most serious cases, it leads to erosion of the subchondral bone, and the appearance of the well-known clinical symptoms. According to the latest discoveries, the focal point for identification of effective treatment strategies is to be found in the humoral crosstalk between cartilage and subchondral bone.

It is therefore clear that the new frontiers of osteoarthrosis treatment must have a multifactorial approach, which takes into account the complexity of the disorder.

Numerous medicaments have been described, some of them also used for other disorders, which exhibit in vitro activity on various OA models and are therefore potentially useful for clinical purposes. However, their development in systemic formulations for human use is often greatly limited by toxicity and pharmacokinetics problems.

A strategy for dealing with these aspects is local or locoregional, in particular intra-articular, administration which eliminates the systemic pharmacokinetics and toxicity problems. Intra-articular administration requires formulations in aqueous solvent which can disperse and integrate into the synovial fluid without generating local inflammatory events, as often occurs with non-aqueous solvents. The pH of the formulation must be the same as or very similar to the physiological pH, to ensure that no imbalance is created in a joint already altered by the ongoing disorder. The formulation must also ensure localised, lengthy, gradual release of the active ingredient which is limited to the site of administration. Finally, the active ingredient carried must be stable under sterilisation conditions according to standard methods.

These requirements also apply to locoregional applications outside the joint compartment.

However, many of the medicaments of greatest interest in the field described above are generally rather sensitive to variations in pH, unstable to heat sterilisation, and have a mainly hydrophobic nature. When hydrophilic, they tend to precipitate very quickly in aqueous solution, and therefore do not provide a sufficient residence time after administration for the pharmacological effect to be performed.

Examples of medicaments studied for locoregional administration include rapamycin (sirolimus), statins, calcitonin, everolimus, paclitaxel and steroid compounds.

Rapamycin is a macrolide antibiotic, completely insoluble in aqueous solvents, which is widely used to prevent rejection after organ transplants, and as a coating for stents used to prevent restenosis. It has also been studied for its effects on the joints (*Arthritis Res Ther*, 2014, 16, 482), in view of its ability to activate autophagy in human chondrocytes and its inhibitory action on mTOR, thus preventing the development of OA. mTOR (mammalian Target Of Rapamycin) is a protein-kinase responsible for phosphorylation of serine and threonine which regulates cell growth, proliferation, motility and survival; it is also strongly involved in the cartilage degeneration process that takes place in patients suffering from osteoarthrosis. The inhibition of mTOR by rapamycin can therefore currently represent an interesting strategy for counteracting joint osteoarthrosis.

Simvastatin, and statins in general, in addition to their well-known cholesterol-reducing effects, have been investigated for some time for their anti-inflammatory effects (inhibition of MMPs) and their ability to regulate the osteoblast/osteoclast balance. Statins in general are insoluble in water, unstable at acid and basic pH, and not heat-sterilisable.

Triamcinolone and cortisones in general are widely used in the intra-articular treatment of OA, but are insoluble in water.

Calcitonin is used for its effects on cartilage anabolism; it is not entirely insoluble in an aqueous carrier, but tends to precipitate very quickly, thus preventing an adequate release profile. It is also unstable on heat sterilisation.

Other medicaments still under development include RN-1747, 4α-phorbol 12,13-didecanoate (4αPDD) and arachidonic acid, which act on particular ion channels, such as TRPV4. This is a channel expressed in a wide range of tissues involved in generating calcium-mediated signals, contributing to important functions such as maintenance of cell volume and homeostasis. It has also been demonstrated that TRPV4 plays a crucial part in the development and maintenance of musculoskeletal and cartilage tissue and bone tissue; a TRPV4 malfunction is closely associated with the appearance of inflammatory and osteoarthritic joint problems (McNaughty, *Naunyn Schmiedebergs Arch Pharmacol.* 2015, 388, 437-450). Being able to regulate the correct activation of TRPV4 therefore represents an important target for the treatment of osteoarthritic diseases. The medicaments described above are agonists of the TRPV4 channel, able to regulate its activation and therefore potentially usable for the purposes described above, but the fact that they are poorly soluble or even insoluble in water (as in the case of RN-1747) rules out their clinical use.

There is consequently an evident need for systems that allow the stabilisation of the molecules described at both the formulation and the sterilisation stage, and at the same time allow controlled release at the administration site.

US20160279108 describes the conjugation of rapamycin with low-molecular-weight hyaluronic acid via a linker containing aromatic groups to obtain a water-soluble derivative able to pass into the lymphatic system and accumulate in the lymph nodes. WO2017044135 describes formulations comprising rapamycin encapsulated in phospholipid liposomes which, although they carry the medicament, are relatively large (up to 2 μm), and can create formulation problems because of their sensitivity to pH, ionic strength, carrier gradient, etc. Encapsulation systems for medicaments poorly soluble in polymer particles (polylactic acid, polyglycolic acid, etc.) have also been described. Finally, the known controlled-release systems include hydrogels based on highly hydratable polymers (high-molecular-weight hyaluronic acid, collagen, alginic acid and alginates, etc.), which retain the medicament in the hydrogel mesh or release it gradually as the hydrogel structure breaks down (WO2013179258).

Sulfated hyaluronic acid (HAS), described in EP0702699 and WO2017085622, crosses the skin barrier easily, thus facilitating the passage of pharmacologically active substances. More recently, it has been found that HAS possesses anti-inflammatory properties mediated by modulation of the activity of numerous cytokines, both pro- and anti-inflammatory. HAS can therefore be used in the treatment of disorders mediated by alteration of the cytokine levels (rheumatoid arthritis, asthma, systemic and cutaneous autoimmune diseases, viral infections, atopic dermatitis, eczema, vitiligo and lymphomas, as reported in WO2010130468 and WO2010130466).

DESCRIPTION OF THE INVENTION

A system of stabilisation and controlled release of medicaments which are unstable on sterilisation by standard methods and/or difficult to formulate has now been found, which comprises mixing a medicament with an alkenylamide of sulfated hyaluronic acid (HAS), and subsequent sonication. The sulfate groups make the hyaluronic acid water-soluble without the formation of a hydrogel, and render it sterilisable by filtration, while amidation with a C4-C20 alkenylamine gives HAS the partly hydrophobic nature required for it to be miscible with compounds which are not water-soluble.

Sonication gives rise to the formation of micellar structures, homogeneously suspended in the aqueous carrier (HAS); said suspensions are sterilisable by filtration or heat, using known techniques such autoclaving.

The resulting suspensions can also be freeze-dried, stored at room temperature and reconstituted at the time of use with a sterile aqueous carrier without any loss in titer of the active ingredient, and above all are able to release the active ingredient in a controlled way after administration at the desired site.

The amides of sulfated hyaluronic acid with C4-C20 alkenylamines are novel, and constitute the first object of the invention.

The second object of the invention is aqueous micellar suspensions of a sulfated hyaluronic acid amide with C4-C20 alkenylamines and of a hydrophobic or hydrophilic medicament.

The third object of the invention is a process for the preparation of micellar suspensions which comprises:
  reacting a C4-C20 alkenylamine with a benzalkonium or tetrabutylammonium salt of sulfated hyaluronic acid in an aprotic apolar solvent in the presence of condensing agents;
  mixing the sulfated hyaluronic acid amide obtained in the preceding step with an aqueous suspension or solution of the medicament;
  sonication of the mixture and sterile filtration.

The invention also relates to pharmaceutical compositions comprising said micellar suspensions and optional excipients, and their use for local, locoregional, intra-articular or intraosseous injectable administration, in particular intra-articular injection, for the treatment of osteoarthrosis.

DETAILED DESCRIPTION OF THE INVENTION

The starting hyaluronic acid used in the invention and intended to undergo sulfation and subsequently amidation can be obtained and purified by known methods, for example by extraction from rooster combs (EP138572), fermentation from *Streptococcus* (WO2018020458; WO2019016699), or biosynthesis from *Bacillus* (WO2012032154). The preferred HA is produced and purified from *Streptococcus*, with a weight average MW ranging from 100,000 to 250,000 Da, in particular from 180,000 to 230,000 Da, hereinafter called "MW 200 kDa", or HA with a weight average MW ranging from 500,000 to 730,000 Da. HA with MW 200 kDa is particularly preferred. "Average Molecular Weight" (MW) here means the weight-average MW, calculated by the "intrinsic viscosity" method (*Terbojevich et al., Carbohydr. Res.*, 1986, 363-377).

The HA fractions described above are sulfated by known procedures, with special reference to the processes described in EP702699 and WO2017085622.

The number of sulfate groups per disaccharide unit (degree of sulfation) in the amides according to the invention ranges from 0.5 to 3.5. Degrees of sulfation ranging from 0.5 to 1.5 (HAS-1), 1.5 and 2.5 (HAS-2) or 2.5 and 3.5 (HAS-3) can be conveniently used. HAS with a degree of sulfation ranging from 0.5 to 1.5 (HAS-1) is preferably used.

HAS carboxyl groups are reacted according to the invention with C4-C20 alkenylamines to form an amide bond. In general, the functions not involved in derivatisation are salified with an alkaline or alkaline earth ion, preferably with Na+. The amidation is performed by known techniques, preferably as described in EP1095064, with the appropriate adaptations.

The % molar degree of derivatisation (amidation) of HAS, expressed as moles of alkenylamine/moles of HAS dimer, ranges from 5 to 30%, preferably 10-25%, and more preferably 10-17%.

The alkenylamine preferably contains one or two unsaturations, more preferably one unsaturation. Examples of preferred amines are oleylamine, (2E)-hex-2-en-1-amine and pent-2-en-1-amine. Oleylamine is particularly preferred.

The formula of schematic structures of the structural sub-units of the sulfated hyaluronic acid oleylamide according to the invention is shown below.

1-amine and pent-2-en-1-amine; the degree of molar derivatisation (amidation) of HAS, expressed as moles of alkenylamine/moles of HAS dimer, ranges from 5 to 30%; the concentration of the amide in micellar suspensions ranges from 4 to 20 mg/mL.

x = 0.02-0.20

The amides according to the invention are stable to heat treatment and can therefore be sterilised in the autoclave, as the amide bond is heat-stable. They can also be sterilised by filtration at 0.2 μm, are miscible with both hydrophobic and hydrophilic medicaments, suspended or solubilised in aqueous solvent, with the formation of an aqueous suspension of micellar particles that carry the medicament and regulate its release. The aqueous micellar suspension can be freeze-dried, stored at room temperature and reconstituted with aqueous solvent, any loss in titer of the active ingredient.

The size of the micelles ranges from 5 to 200 nm, preferably from 10 to 50 nm.

The concentration of the amide in the micellar suspensions ranges from 4 to 20 mg/mL.

A preferred concentration of the oleylamide is 13 mg/mL.

Examples of medicaments which can be used according to the invention are rapamycin, triamcinolone, statins (in particular simvastatin), calcitonin, RN-1747, 4α-phorbol 12,13-didecanoate (4αPDD), everolimus, paclitaxel and arachidonic acid. Rapamycin is particularly preferred.

The concentration of medicament which can be loaded into the micellar suspensions according to the invention depends on the hydrophobicity of the medicament itself and the desired degree of amidation of HAS, and can therefore be modulated by balancing said characteristics.

The micellar suspensions according to the invention therefore consist of amides of sulfated hyaluronic acid (HAS) with a degree of sulfation ranging from 0.5 to 1.5 (HAS-1), 1.5 and 2.5 (HAS-2) or 2.5 and 3.5 (HAS-3), prepared from HA with a weight average MW ranging from 180,000 to 230,000 Da or a weight average MW ranging from 500,000 to 730,000 Da; amidation is obtained with C4-C20 alkylamines, preferably oleylamine, (2E)-hex-2-en- Preferably, the micellar suspensions according to the invention consist of sulfated hyaluronic acid (HAS) amides with a degree of sulfation ranging from 0.5 to 1.5 (HAS-1), prepared from HA with a weight average MW ranging from 180,000 to 230,000 Da; amidation is obtained with oleylamine; the degree of molar derivatisation (amidation) of HAS, expressed as moles of alkenylamine/moles of HAS dimer, ranges from 10 to 17%; the concentration of the amide in the micellar suspensions is preferably 13 mg/mL. The micellar suspensions according to the invention are obtained by dispersing the hydrophobic medicament in a buffer solution containing the amide, then sonicating in an ultrasound bath and subsequently filtering through an 0.2 μm filter, which makes the product sterile. The buffer is preferably PBS phosphate buffer at pH=7, 2-N-morpholino methanesulfonic acid at a pH ranging from 5 to 8, 4-(2-hydroxyethyl)-1-piperazinethylsulfonic acid at a pH ranging from 5 to 8, and more preferably is PBS at pH=7. If the medicament used is water-soluble, it is dissolved, rather than dispersed, in the buffer solution.

Schematically, therefore, the preparation of the stabilisation and controlled release systems according to the invention involves:
synthesis of the desired grade of HAS in the form of sodium salt, from HA-Na or from HA-TBA (tetrabutylammonium salt);
preparation of HAS benzalkonium salt (BA) or TBA salt from HAS-Na;
partial derivatisation of the HAS-BA or HAS-TBA carboxyls with a C4-C20 alkenylamine;
preparation of the HAS-alkenylamide/medicament formulation in the form of a micellar suspension.

The micellar suspensions can be administered "as is", after sterilisation, or excipients such as maltose, mannitol or glucose can be added at a concentration ranging from 1 to 9% by weight, preferably maltose at a concentration of 4.5% of the weight of the formulation.

The following examples illustrate the invention in greater detail.

Example 1: Synthesis of HAS1

1.1 Synthesis of HAS1-Na from HA sodium salt. 4.0 g ($9.96 \times 10^{-3}$ mol; 1 eq) of HA-Na (HA MW 200 kDa) was dispersed in 220 mL of DMSO and 3.6 mL of methane-sulfonic acid (5 eq) was added, after which the mixture was left under stirring for 24 h at room temperature (RT). When dissolution was complete, 12.8 g (8 eq) of pyridine sulfur trioxide (Pyr·SO$_3$) was added. After standing overnight at RT, the product was precipitated with ethanol (EtOH); the resulting precipitate was filtered through a Gooch crucible, washed twice with EtOH and redissolved in 150 mL of deionised water; 8 mL of NaCl saturated solution and 115 mL of DMSO were added, and the pH was adjusted to 3.4±0.1 with 3 M NaOH. The product was precipitated with 440 mL of EtOH; the resulting precipitate was filtered through a Gooch crucible, washed with a mixture of EtOH/H$_2$O (80:20) and with EtOH, and finally vacuum dried at 37° C.

7.78 g of HAS1-Na was obtained as a yellowish-white powder. (Yield: 97.6%).

1.2 Synthesis of HAS1-Na from HA TBA Salt.

2.0 g ($3.22 \times 10^{-3}$ mol; 1 eq) of HA-TBA (HA MW 200 kDa) was dissolved in 200 mL of DMSO. When dissolution was complete. 1.28 g (2.5 eq) of pyridine sulfur trioxide (Pyr·SO$_3$) was added. After standing overnight at RT, the product was precipitated with ethanol (EtOH); the resulting precipitate was filtered through a Gooch crucible, washed twice with EtOH and redissolved in 150 mL of deionised water; 8 ml of NaCl saturated solution and 115 mL of DMSO were added, and the pH was adjusted to 3.4±0.1 with 3 M NaOH. The product was precipitated with 430 mL of EtOH; the resulting precipitate was filtered through a Gooch crucible, washed with a mixture of EtOH/H$_2$O (80:20) and with EtOH, and finally vacuum dried at 37° C.

1.52 g of HAS1-Na was obtained as a yellowish-white powder. (Yield: 93.8%)

Example 2: Synthesis of HAS1-Oleylamide [10%] Conjugate from HAS1-BA (Benzalkonium)

2.5 g ($5.0 \times 10^{-3}$ mol, 1 eq) of HAS1-Na was dissolved in 100 mL of deionised water; 3.0 g of benzalkonium chloride (BA$^+$Cl$^-$) was dissolved separately in 100 mL of deionised water. When solubilisation was complete the BA$^+$Cl$^-$ solution was added to the HAS1 solution, thus obtaining a precipitate which was filtered through a Gooch crucible, washed in H$_2$O, in ethanol and then in acetone, and dried in a rotavapor under high vacuum. The HAS1-BA precipitate isolated was solubilised in 160 mL of DMSO; 0.114 g (0.14 eq) of CDI (carbodiimide) and 0.10 mL of methanesulfonic acid (0.3 eq) were then added. After 30 min. stirring at 40° C., 1.32 mL (0.8 eq) of oleylamine was added, and the reaction continued overnight under slow stirring at 40° C. 16 mL of NaCl saturated solution was added the next day, and the product was precipitated with ethanol. The resulting precipitate was filtered through a Gooch crucible and washed with 2 volumes of a mixture of ethanol/H$_2$O (85:15), then with ethanol, and finally with acetone. The resulting product was dissolved in 50 mL of deionised H$_2$O and dialysed (Spectra/Por® dialysis membrane with cut-off=12, 000-14,000 Da) for 3 days in PBS buffer pH 7, and 1 day in H$_2$O. Finally, the dialysed product was frozen and freeze-dried. 1.9 g of a yellowish-white powder was obtained. (Yield: 72.2%).

Characterisation: The degree of derivatisation was calculated by $^1$H-NMR analysis: 20 mg of HAS1-oleylamide was dissolved in 1 mL of D$_2$O and analysed with a Bruker Advance spectrometer (300 MHz). The signals used to determine the degree of derivatisation were as follows: δ 0.6-0.9 (t, 3H, HAS1-CONH—(CH$_2$)$_8$—CH=CH—(CH$_2$)$_7$-CH$_3$), δ 1.9-1.7 (s, 3H, HAS1-NHCO·CH$_3$) (moles of oleylamide vs. moles of HAS1 repeating unit).

Example 3: Synthesis of HAS1-Oleylamide [10%] Conjugate from HAS1-TBA a) About 10 g of Amberlyst sulfonic resin was washed 5 times with MilliQ H$_2$O in a jacketed column (the resin occupied about half the volume of the column). 20 mL of 55% TBA-OH solution was added, shaken and left in contact with the resin for 2 h at RT. The resin was washed with about 0.5 L of MilliQ H$_2$O until the pH of the eluate fell below 10.5 (pH=10.48).

2.5 g ($5.0 \times 10^{-3}$ mol, 1 eq) of HAS1Na dissolved in 30 mL of H$_2$O was loaded, percolated at 5 mL/min and washed with a further 60 mL. The eluate was collected, frozen and freeze-dried; 3.9 g of HAS1-TBA was obtained in the form of a pale yellow lyophilisate.

b) The HAS1-TBA derivative isolated was solubilised in 160 mL of DMSO; 0.114 g (0.14 eq) of CDI (carbodiimide) and 0.10 mL of methanesulfonic acid (0.3 eq) were then added. After 30 min. stirring at 40° C., 1.32 mL (0.8 eq) of oleylamine was added, and the reaction continued overnight under slow stirring at 40° C. 16 mL of NaCl saturated solution was added the next day, and the product was precipitated with ethanol. The resulting precipitate was filtered through a Gooch crucible and washed with 2 volumes of a mixture of ethanol/H$_2$O (85:15), then with ethanol, and finally with acetone.

2.5 g of a yellowish-white powder was obtained. (Yield: 94.1%).

After characterisation by $^1$H-NMR analysis as described in Example 2, a degree of derivatisation of 10.6±0.8% mol/mol (moles of oleylamide vs. moles of HAS1 repeating unit) was determined.

Example 4: Synthesis of HAS1-Oleylamide [17%] from HAS1-TBA

After preparation of the HAS1-TBA derivative as described in Example 3, paragraph a), the synthesis proceeded as follows:

2.5 g ($5.0 \times 10^{-3}$ mol, 1 eq) of isolated HAS1-TBA derivative was solubilised in 160 mL of DMSO; 0.163 g (0.2 eq) of CDI (carbodiimide) and 0.10 mL of methanesulfonic acid (0.3 eq) were then added. After 30 min. stirring at 40° C., 1.32 mL (0.8 eq) of oleylamine was added, and the reaction continued overnight under slow stirring at 40° C. 16 mL of NaCl saturated solution was added the next day, and the product was precipitated with ethanol. The resulting precipitate was filtered through a Gooch crucible and washed with 2 volumes of a mixture of ethanol/H$_2$O (85:15), then with ethanol, and finally with acetone. 2.6 g of a spongy white product was obtained. (Yield: 96.1%).

Example 5: Synthesis of HAS1-Oleylamide [25%] from HAS1-TBA

After preparation of the HAS1-TBA derivative as described in Example 3, paragraph a), the synthesis proceeded as follows:

2.5 g ($5.0 \times 10^{-3}$ mol, 1 eq) of isolated HAS1-TBA derivative was solubilised in 160 mL of DMSO; 0.285 g (0.35 eq) of CDI (carbodiimide) and 0.15 mL of methanesulfonic acid (0.45 eq) were then added. After 30 min. stirring at 40° C., 1.32 mL (0.8 eq) of oleylamine was added, and the reaction continued overnight under slow stirring at 40° C. 16 mL of NaCl saturated solution was added the next day, and the product was precipitated with ethanol. The resulting precipitate was filtered through a Gooch crucible and washed with 2 volumes of a mixture of ethanol/$H_2O$ (85:15), then with ethanol, and finally with acetone. 2.6 g of a spongy white product was obtained. (Yield: 94.5%).

After characterisation by $^1$H-NMR analysis as described in Example 2, a degree of derivatisation of 24.5±1.5% mol/mol (moles of oleylamide vs. moles of HAS1 repeating unit) was determined.

Example 6: Synthesis of HAS2-Oleylamide [10%] from HAS2-TBA

HAS2 was prepared by the procedure described in Example 1.1, only varying the amount of pyridine sulfur trioxide (Pyr≠$SO_3$) used (16 g).

After preparation of the HAS2-TBA derivative as described in Example 3, paragraph a), the synthesis proceeded as follows:

2 g ($3.3 \times 10^{-3}$ mol, 1 eq) of HAS2-TBA was solubilised in 160 ml of DMSO; 0.074 g (0.14 eq) of CDI (carbodiimide) and 0.06 mL of methanesulfonic acid (0.3 eq) were then added. After 30 min. stirring at 40° C., 1.08 mL (0.8 eq) of oleylamine was added, and the reaction continued overnight under slow stirring at 40° C. 16 mL of NaCl saturated solution was added the next day, and the product was precipitated with ethanol. The resulting precipitate was filtered through a Gooch crucible and washed with 2 volumes of a mixture of ethanol/$H_2O$ (85:15), then with ethanol, and finally with acetone.

2.0 g of a spongy pale yellow-white product was obtained. (Yield: 94.5%).

After characterisation by $^1$H-NMR analysis as described in Example 2, a degree of derivatisation of 9.8±0.6% mol/mol (moles of oleylamide vs. moles of HAS2 repeating unit) was determined.

Example 7: Synthesis of HAS3-Oleylamide [11%] from HAS1-TBA

HAS3 was prepared by the procedure described in Example 1.1, only varying the amount of pyridine sulfur trioxide (Pyr.$SO_3$) used (20.8 g).

After preparation of the HAS3-TBA derivative as described in Example 3, paragraph a), the synthesis proceeded as follows:

2 g ($2.8 \times 10^{-3}$ mol, 1 eq) of HAS3-TBA was solubilised in 160 ml of DMSO; 0.063 g (0.14 eq) of CDI (carbodiimide) and 0.05 mL of methanesulfonic acid (0.3 eq) were then added. After 30 min. stirring at 40° C., 0.73 mL (0.8 eq) of oleylamine was added, and the reaction continued overnight under slow stirring at 40° C. 16 mL of NaCl saturated solution was added the next day, and the product was precipitated with ethanol. The resulting precipitate was filtered through a Gooch crucible and washed with 2 volumes of a mixture of ethanol/$H_2O$ (85:15), then with ethanol, and finally with acetone.

1.7 g of a spongy pale yellow-white product was obtained. (Yield: 93.9%).

After characterisation by $^1$H-NMR analysis as described in Example 2, a degree of derivatisation of 11.1±0.6% mol/mol (moles of oleylamide vs. moles of HAS3 repeating unit) was determined.

Example 8: Preparation of the Formulation HAS1-Oleylamide (13 mg/mL)/Rapamycin 65 mg of HAS1-oleylamide prepared as in Example 3 (derivatisation 10% mol) was weighed in a 50 mL test tube, and 20 mg of rapamycin (1CHEM LP) and 5.0 mL of PBS pH7 were added. The suspension was left under stirring for 2 hours at room temperature and sonicated for 10 min (Sonifer 250 sonicator), then filtered at 0.2 µM with a Sartorius cellulose acetate filter.

Analysis of rapamycin content in the formulation:

HPLC-MS Agilent 1260 system: Kinetex C8 column; flow rate: 0.35 ml/min; UV detector at 216 nm; Mobile Phase (MP): ammonium acetate (2 g/L) (A); Acetonitrile (B); Gradient: 40% of mobile phase (B) for 3 min then gradient from 40% to 97% of (B) in 4 min.

System calibrated by injecting a rapamycin standard at 0.14 mg/mL (the rapamycin was dissolved to 1.4 mg/mL in acetonitrile (ACN) and diluted 1/10 with MP (40% (B)/60% (A)). Retention time: 7.6 min.

The HAS1-oleylamide/rapamycin formulation was diluted 1/3 in MP (40% (B)/60% (A) and injected directly into HPLC. Rapamycin retention time: 7.6 min. The quantitative analysis was conducted with reference to the area of the rapamycin standard. MS analysis confirms the structure of rapamycin and the absence of degradation products (theoretical MS 914.2; measured 914.3+$Na^+$). Rapamycin content detected in the formulation: 0.16 mg/mL.

Example 9: Preparation of the Formulation HAS1-Oleylamide (9 mg/mL)/Rapamycin 65 mg of HAS1-oleylamide prepared as in Example 3 (derivatisation 10% mol) was weighed in a 50 mL test tube, and 20 mg of rapamycin (1CHEM LP) and 5.0 mL of PBS pH7 were added. The suspension was left under stirring for 2 hours at room temperature and sonicated for 10 min (Sonifer 250 sonicator), then filtered at 0.2 µM with a Sartorius cellulose acetate filter.

Rapamycin content in the formulation, analysed as in Example 8: 0.15 mg/mL.

Example 10: Preparation of the Formulation HAS1-Oleylamide (13 mg/mL)/Rapamycin 65 mg of HAS1-oleylamide prepared as in Example 4 (derivatisation 17% mol) was weighed in a 50 mL test tube, and 20 mg of rapamycin (1CHEM LP) and 5.0 mL of PBS pH7 were added. The suspension was left under stirring for 2 hours at room temperature and sonicated for 10 min (Sonifer 250 sonicator), then filtered at 0.2 µM with a Sartorius cellulose acetate filter.

Rapamycin content in the formulation, analysed as in Example 8: 0.21 mg/mL.

Example 11 (Comparative): Preparation of a Formulation of Rapamycin in PBS 20 mg of rapamycin was weighed in a 50 mL test tube and 5.0 mL of PBS pH7 was added; the suspension was left under stirring for 2 hours at room temperature and sonicated for 10 min (Sonifer 250 sonicator), then filtered at 0.2 μM with a Sartorius cellulose acetate filter. Rapamycin content in the formulation, analysed as in Example 8: 0.00 mg/mL.

Example 12: Preparation of the Formulation HAS1-Oleylamide (13 mg/mL)/RN-1747

65 mg of HAS1-oleylamide prepared as in Example 3 (derivatisation 10% mol), was weighed in a 50 mL test tube, and 21.5 mg of RN-1747 (Key Organics), 4.0 mL of PBS pH7 and 0.5 mL of 1M HCl were added; the suspension was left under stirring for 2 hours at room temperature and sonicated for 10 min (Sonifer 250 sonicator), adjusted to pH 7 with 0.5 mL of 1M NaOH, and then filtered at 0.2 μM with a Sartorius cellulose acetate filter.

Analysis of RN-1747 Content in the Formulation:

HPLC-MS Agilent 1260 system: Kinetex C8 column; flow rate: 0.35 ml/min; UV detector at 216 nm; Mobile Phase (MP): ammonium acetate (2 g/L) (A); Acetonitrile (B); Gradient: 20% of mobile phase (B) for 3 min then gradient from 20% to 97% of (B) in 4 min.

System calibrated by injecting an RN-1747 standard at 0.15 mg/mL (the RN-1747 was dissolved to 1.5 mg/mL in ACN and diluted 1/10 with MP ((20% (B)/80% (A)). Retention time: 8.4 min.

The HAS1-oleylamide/RN-1747 formulation was diluted 1/3 in MP (20% (B)/80% (A)) and injected directly into HPLC. RN-1747 retention time: 8.4 min. The quantitative analysis was conducted with reference to the area of the RN-1747 standard. MS analysis confirms the structure of RN-1747 and the absence of degradation products (theoretical MS 395.9; measured 395.5+$Na^+$). RN-1747 content found in the formulation: 0.44 mg/mL.

Example 13: Preparation of the Formulation HAS1-Oleylamide (13 mg/mL)/Simvastatin 65 mg of HAS1-oleylamide prepared as in Example 3 (derivatisation 10% mol) was weighed in a 50 mL test tube, and 20.5 mg of simvastatin (Fluorochem) and 5.0 mL of PBS pH7 were added; the suspension was left under stirring for 2 hours at room temperature and sonicated for 10 min (Sonifer 250 sonicator), adjusted to pH 7 with 0.5 mL of 1M NaOH, and then filtered at 0.2 μM with a Sartorius cellulose acetate filter.

Analysis of Simvastatin Content in the Formulation:

HPLC-MS Agilent 1260 system: Kinetex C8 column; flow rate: 0.35 ml/min; UV detector at 216 nm; Mobile Phase: ammonium acetate (2 g/L) (A); Acetonitrile (B); Gradient: 40% of mobile phase (B) for 3 min then gradient from 40% to 97% of (B) in 4 min.

System calibrated by injecting a simvastatin standard at 0.3 mg/mL (simvastatin was dissolved to 3.0 mg/mL in ACN and diluted 1/10 with MP ((40% (B)/60% (A)). Retention time: 7.1 min.

The HAS1-oleylamide/simvastatin formulation was diluted 1/3 in MP (40% (B)/60% (A) and injected directly into HPLC. Simvastatin retention time: 7.1 min. The quantitative analysis was conducted with reference to the area of the simvastatin standard. MS analysis confirms the structure of simvastatin and the absence of degradation products (theoretical MS 418.3; measured 418.6+$Na^+$). Simvastatin content found in the formulation: 0.20 mg/mL.

Example 14: Preparation of the Formulation HAS1-Oleylamide (13 mg/mL)/Triamcinolone Acetonide 65 mg of HAS1-oleylamide prepared as in Example 3 (derivatisation 10% mol) was weighed in a 50 mL test tube, and 20.5 mg of triamcinolone acetonide (Spectrum) and 5.0 mL of PBS pH 7 were added; the suspension was left under stirring for 2 hours at room temperature and sonicated for 10 min (Sonifer 250 sonicator), adjusted to pH 7 with 0.5 mL of 1M NaOH, and then filtered at 0.2 μM with a Sartorius cellulose acetate filter.

Analysis of Triamcinolone Hexacetonide Content in the Formulation:

HPLC-MS Agilent 1260 system: Kinetex C8 column; flow rate: 0.35 ml/min; UV detector at 216 nm; Mobile Phase (MP): ammonium acetate (2 g/L) (A); Acetonitrile (B); Gradient: 20% of mobile phase (B) for 3 min then gradient from 20% to 97% of (B) in 4 min.

System calibrated by injecting a triamcinolone hexacetonide standard at 0.3 mg/mL (the triamcinolone was dissolved to 3.0 mg/mL in ACN and diluted 1/10 with MP ((20% (B)/80% (A)). Retention time: 8.6 min.

The HAS1-oleylamide/triamcinolone formulation was diluted 1/3 in MP (20% (B)/80% (A)) and injected directly into HPLC. Triamcinolone retention time: 8.6 min. The quantitative analysis was conducted with reference to the area of the triamcinolone standard. MS analysis confirms the structure of triamcinolone hexacetonide and the absence of degradation products (theoretical MS 532.6; measured 532.3+$Na^+$).

Triamcinolone hexacetonide content found in the formulation: 0.02 mg/mL.

Example 15: Preparation of the Formulation HAS1-Oleylamide (13 mg/mL)/Salmon Calcitonin 65 mg of HAS1-oleylamide, prepared as in Example 3 (derivatisation 10% mol), was weighed in a 10 mL test tube; 16.0 mg of salmon calcitonin (Bachem), and 5.0 mL of 0.2M $CH_3COONH_4$ pH 5.2 were added, the solution was left under stirring for 2 hours at room temperature and sonicated for 10 min (Sonifer 250 sonicator), then filtered at 0.2 μM through a Sartorius cellulose acetate filter. Analysis of calcitonin content in the formulation:

HPLC-MS Agilent 1260 system: Kinetex C8 column; flow rate: 0.35 ml/min; UV detector at 254 nm; Mobile Phase (MP): ammonium acetate (2 g/L) (A); Acetonitrile (B); Gradient: 15% of mobile phase (B) for 3 min then gradient from 15% to 97% of (B) in 4 min.

System calibrated by injecting a salmon calcitonin standard at 0.8 mg/mL (the calcitonin was dissolved to 8.0 mg/mL in ACN and diluted 1/10 with MP ((15% (B)/85% (A)). Retention time: 7.4 min.

The HAS1-oleylamide/salmon calcitonin formulation was diluted 1/3 in MP (15% (B)/85% (A)) and injected directly into HPLC. Calcitonin retention time: 7.4 min. The quantitative analysis was conducted with reference to the area of the salmon calcitonin standard. MS analysis confirms the structure of salmon calcitonin and the absence of degradation products (theoretical MS 3431.9; measured: (1144.4=3430.2+3H$^+$)/3).

Salmon calcitonin content found in the formulation: 3.2 mg/mL.

When the formulations described in Examples 9-17 are to be freeze-dried, it is advisable to add an excipient selected from maltose, mannitol and glucose, preferably maltose, in the amount of 4.5% w/w. The addition should be made after sonication and before filtration through an 0.2 µM filter.

Example 16: Preparation of the Formulation HAS1-Oleylamide (13 mg/mL)/Paclitaxel 65 mg of HAS1-oleylamide prepared as in Example 4 (derivatisation 17% mol) was weighed in a 50 mL test tube, and 20 mg of paclitaxel and 5.0 mL of PBS pH7 were added. The suspension was left under stirring for about 2 hours at room temperature and sonicated for 10 min (Sonifer 250 sonicator), then filtered at 0.2 µM with a Sartorius cellulose acetate filter.

Analysis of paclitaxel content in the formulation:

HPLC-MS Agilent 1260 system: Kinetex C18 column; flow rate: 1.0 ml/min; UV detector at 220 nm; Mobile Phase (MP): ammonium acetate (2 g/L) (A); acetonitrile (B); Gradient: 1% of mobile phase (B) for 3 min then gradient from 5% to 95% of (B) in 10 min.
System calibrated by injecting a paclitaxel standard (dissolved in acetonitrile) at 0.46 mg/mL.

The HAS1-oleylamide/paclitaxel formulation was diluted 1/3 in acetonitrile and injected directly into HPLC. Paclitaxel retention time: 11.3 min. The quantitative analysis was conducted with reference to the area of the paclitaxel standard. MS analysis confirms the structure of paclitaxel and the absence of degradation products (theoretical MS; measured 853.9+Na$^+$). Paclitaxel content found in the formulation: 0.23 mg/mL.

Example 17: Test for Micelle Formation

The formation of micelles able to carry the hydrophobic active ingredients was demonstrated by TEM microscope analysis.

Figure 1:
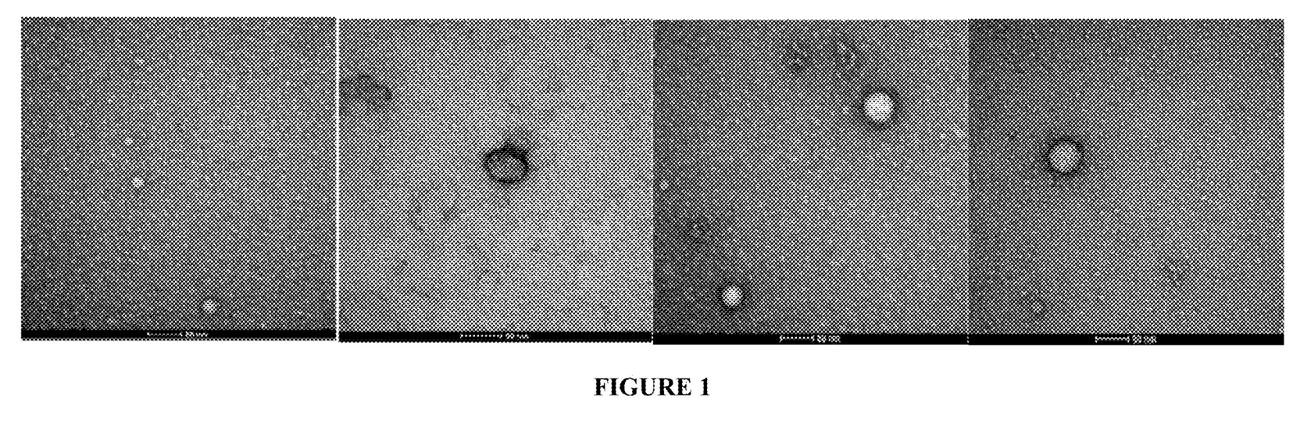
FIG. 1 shows the formation of micelles able to carry the hydrophobic active ingredients was demonstrated by TEM microscope analysis.

25 µl of the formulation of Example 8, diluted to 0.2 mg/mL, was positioned on a 400 mesh grid; after dyeing with 1% uranyl acetate the sample was observed under a TecnaiG^2(FEI) transmission electron microscope operating at 100 kV. The images were acquired with a Veleta digital camera (Olympus Soft Imaging System). The formation of vesicles compatible with micellar systems, having a mean diameter ranging from 10 to 50 nm, was evident (FIG. 1).

Example 18: Evaluation of Stability of Sterilised Formulations on Storage and Freeze-Drying Experimental tests were conducted to test the effects of freeze-drying of the formulations according to the invention on the active ingredient content. In particular, the formulation of Example 8 was tested, with the addition of 0.23 g of maltose (4.5% w/w) before filtration through an 0.2 µM filter.

The resulting filtered solution was divided under sterile conditions between 9×1 mL vials (0.5 mL per vial). The vials were positioned in the freeze-dryer (Epsilon 2-6DLS plus); the freeze-dryer probe was positioned on one of them (initial freezing temperature: at 40° C.; freezing of sample: −17° C.; freeze-drying temperature: −29° C.). The vacuum at the freeze-drying stage was set to 0.08 bars; the freeze-dried samples appeared in the form of an uncollapsed pale yellow-white cake.

One sample was dissolved with 0.58 mL of H$_2$O immediately after freeze-drying, and the rapamycin titer was analysed by the HPLC-MS method already described. The other samples were stored at 40° C. for 6 months, and rapamycin titration was performed after 3 and 6 months.

The rapamycin titer detected was 95%, both immediately after freeze-drying and after 3 or 6 months at 40°, demonstrating the efficacy of the stabilisation and release systems described herein.

Figure 2:
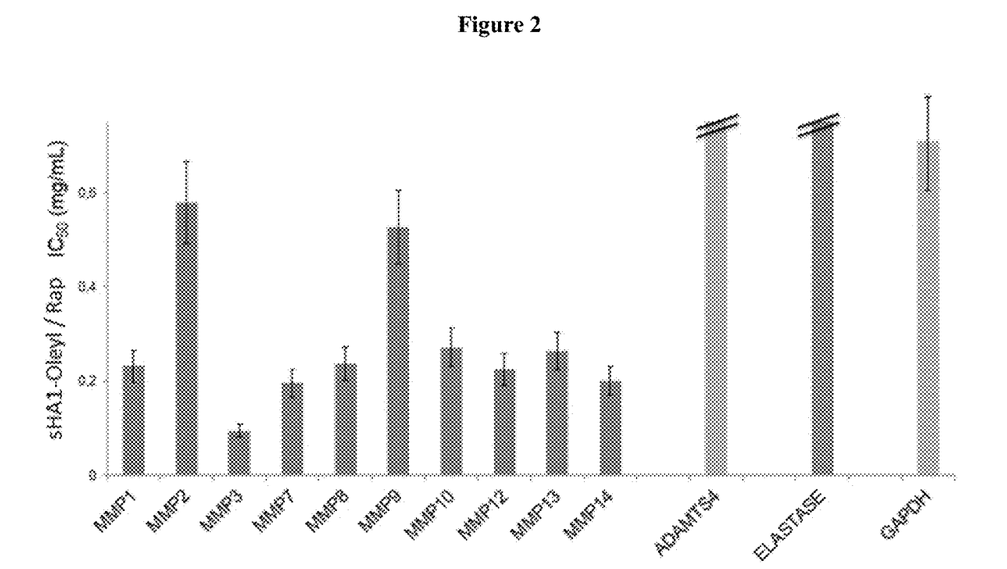
FIG. 2 shows the inhibitory effect of the HAS1-oleylamide/rapamycin formulation, prepared as in Example 10 on synovial fluid proteases.

Example 19: In Vitro Test of Synovial Fluid Protease Inhibition Induced by the HAS1-Oleylamide/Rapamycin Derivative The HAS1-oleylamide/rapamycin formulation, prepared as in Example 10, i.e. containing 13 mg/ml of HAS1-oleylamide and 0.21 mg/ml of rapamycin, was tested in vitro to evaluate its inhibitory effect on synovial fluid proteases, specifically on:

10 different human metalloproteinases (MMPs);
Elastase;
Aggrecanase 1 (ADAMTs4)

using glyceraldehyde-3-phosphate dehydrogenase as control (as known to the skilled person, GAPDH is a constitutive enzyme, physiologically expressed in every cell, whose inhibition prevents cell activity, leading to cell death. Evaluation of its inhibition by the species tested measures the specificity of action and toxicity of the species), and evaluating the initial hydrolysis rate of the various proteases (RFU/s) in the presence of the different concentrations of the formulation. The IC$_{50}$, i.e. the concentration of the inhibitor able to inhibit 50% of the enzymatic activity of the MMP, was calculated by interpolating the activity of standardised MMPs vs the concentration of the formulation, and its values are shown in FIG. 2.

Materials and Methods:

for the MMPs: the "Fluorimetric MMP Inhibitor Profiling Kit" (BML-AK016) was used; the formulation described in Example 10 was tested at the HAS1-oleylamide concentration of 0.8 mg/mL; 0.4 mg/mL and 0.1 mg/mL, corresponding to 0.013; 0.006 and 0.0016 mg/mL of rapamycin respectively, and using the same concentration of substrate (4.0 µM);

for the elastase: the "Fluorimetric Sensolyte Rh110 Elastase kit" (AS-72178) was used; the formulation referred to in Example 10 was tested at the HAS1-oleylamide concentration of 0.7 mg/mL; 0.35 mg/mL and 0.1 mg/mL, corresponding to 0.0112; 0.0056 and 0.0016 mg/mL of rapamycin respectively, and using the same concentration of substrate (25 µM);

for ADAMTs4: the "Aggrecanase Activity Assay Kit" (KA-1497) was used; the formulation referred to in Example 10 was tested at the HAS1-oleylamide concentration of 0.6 mg/mL; 0.3 mg/mL and 0.1 mg/mL, corresponding to 0.0096; 0.0048 and 0.0016 mg/mL of rapamycin respectively, and using the same concentration of substrate (1 µM);

for GAPDH: the "Colorimetric GAPDH Activity Assay Kit" (K680-100) was used; the formulation described in Example 10 was tested at the HAS1-oleylamide concentration of 0.6 mg/mL; 0.3 mg/mL and 0.1 mg/mL, corresponding to 0.0096, 0.0048 and 0.0016 mg/mL of rapamycin respectively, and using the same concentration of substrate (1 µM).

The results obtained are shown in FIG. 2.

It is evident that the HAS1-oleylamide/rapamycin formulation selectively inhibits MMPs, demonstrating superior activity on all metalloproteinases except MMP2 and MMP9; conversely, it has no effect on the other synovial fluid proteases tested, or on the control enzyme (GAPDH).

This means that the HAS1-oleylamide/rapamycin formulation acts specifically and selectively on the MMPs, and in particular on the MMPs which are overexpressed in the synovial fluid of patients with OA, and are responsible for collagen degradation.

Example 20: Ex Vivo Tests on Collagen Release from Cartilage Explants Induced by the HAS1-Oleylamide/Rapamycin Derivative The efficacy of the HAS1-oleylamide/rapamycin formulation on collagen release was evaluated on an ex vivo cartilage inflammation model described in the literature (Ams, S. et al., *Bioorganic & Medicinal Chemistry* 2012, 20: 2131-2140). The HAS1-oleylamide/rapamycin formulation tested is the one prepared in Example 10, at different concentrations.

Cartilage was harvested from the patello-femoral groove and femoral condyles obtained from an adult bovine femur, and cartilage biopsies ($\emptyset$=3 mm) were taken with a steel punch. The biopsies were cultured in a 48-well Multiwell plate (BD Falcon, cat. no. 353078, Italy) at 37° C., with 5% $CO_2$, for 24 hours in DMEM/F-12 (1:1) (Life Technologies, cat. no. 11320074, Italy) containing 2% foetal bovine serum (Life Technologies, cat. no. 10270106, Italy). After incubation, the biopsies were washed with PBS and divided into the following groups:

1) a control group, wherein the cells were neither treated nor stimulated;
2) one group treated with the pro-inflammatory cytokines OSM (Oncostatin M) and IL-1β (10 ng/mL each);
3) one group exposed to OSM and IL-1β and treated with HAS1-oleylamide (1.3 mg/mL)/rapamycin (0.021 mg/mL);
4) one group exposed to OSM and IL-1β and treated with HAS1-oleylamide (0.3 mg/mL)/rapamycin (0.005 mg/mL);
5) one group exposed to OSM and IL-1β and treated with HAS1-oleylamide (0.1 mg/mL)/rapamycin (0.002 mg/mL).

Figure 3:
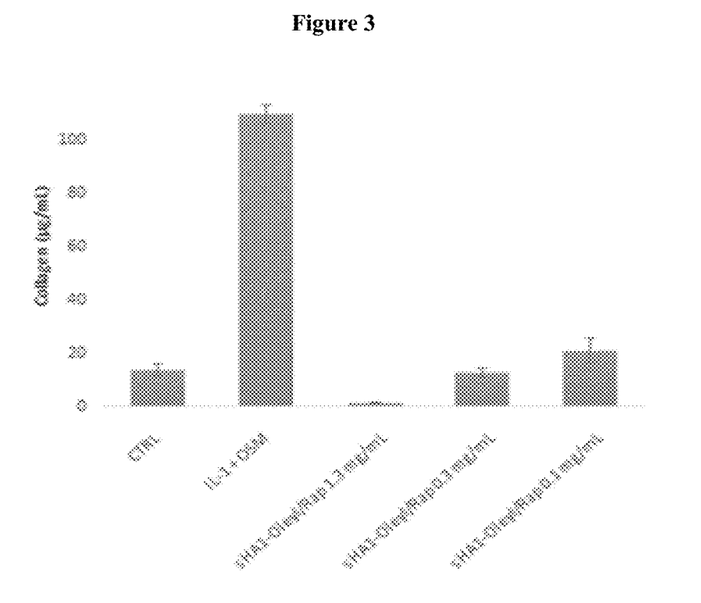
FIG. 3 show the biopsies from the study in Example 20 of collagen release from cartilage explants induced by the HAS1-oleylamide/rapamycin derivative.

After 0, 7, 14 and 21 days, the biopsy culture medium was aspirated and replaced with fresh culture medium containing inflammatory cytokines and the HAS1-oleylamide/rapamycin formulation to be tested. After 21-day incubation, the biopsy medium was collected and the soluble collagen released was measured by the "Sircol collagen assay kit" (Biocolor, cat. no. S1000, UK) according to the manufacturer's instructions. As will be seen in FIG. 3, the biopsies of the group treated with IL-1/OSM released, as expected, a significantly higher amount of soluble collagen into the culture medium than the control, indicating highly significant inflammatory damage. The HAS1-oleylamide/rapamycin formulation significantly reduces the collagen release induced by inflammatory stimulus, in practice reducing it to the control levels even at the lowest concentration tested, and practically eliminating it at the concentration of 1.3/0.021 mg/ml. This effect confirms the ability of the formulation to inhibit collagen release, and indicates a marked anti-inflammatory effect of the HAS1-oleylamide/rapamycin formulation.

Example 21: Effect on MMP13 Expression Induced by the HAS1-Oleylamide/Rapamycin Derivative The MMP-13 concentration in the supernatants obtained from the collagen release efficacy tests (previous Example) was determined in order to quantify the presence in the samples of the main enzyme responsible for cartilage degradation. An ELISA assay (Mybiosource, cat. no. MBS2880297, USA) was used for this purpose, according to the manufacturer's instructions.

Figure 4:
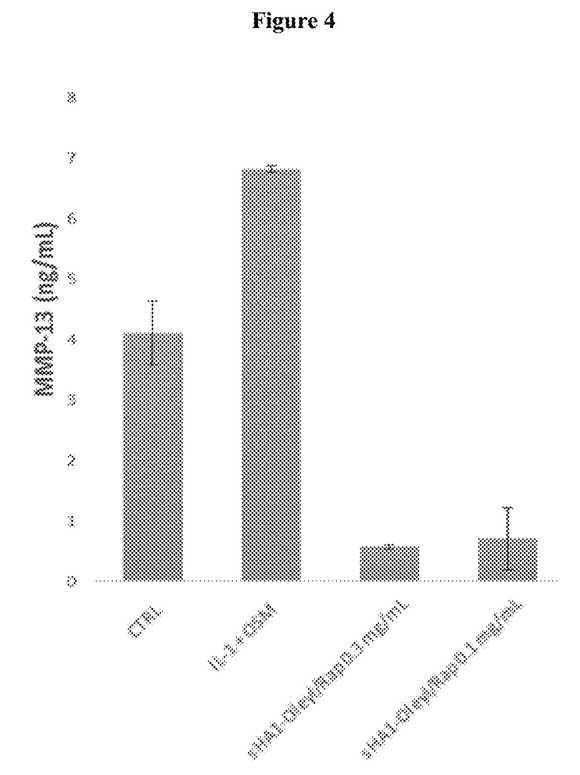
FIG. 4 shows the effects on MMP13 expression induced by the HAS1-oleylamide/rapamycin derivative of Example 21.

The results set out in FIG. 4 demonstrate that treatment of the samples with the inflammatory cytokines OSM and IL-1β significantly increases the concentration of MMP-13 in the supernatant, as expected. Conversely, the supernatants of the samples treated with the HAS1-oleylamide/rapamycin formulation at the concentrations of 0.3 and 0.1 mg/mL, corresponding to 0.0048 and 0.0016 mg/mL of rapamycin respectively, contain significantly lower MMP-13 levels than the control samples, even at the lowest concentration tested. This unequivocally confirms the efficacy of the formulation tested in reducing the expression of the inflammatory factors underlying joint cartilage degradation.

Figure 5:
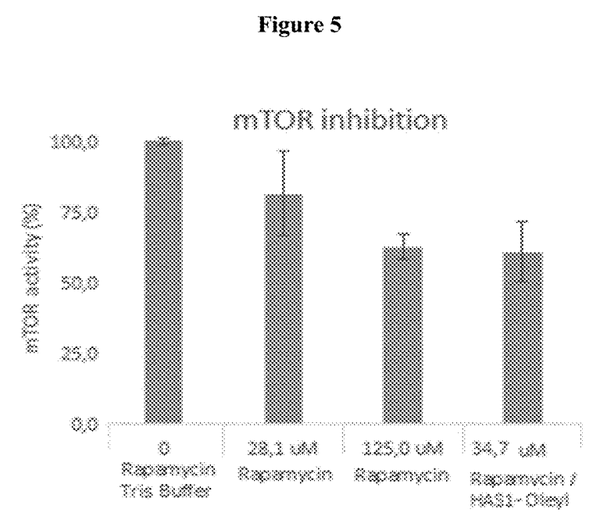
FIG. 5 show the results of the in vitro test of mTOR inhibition induced by the HAS1-oleylamide/rapamycin derivative of Example 22.

Example 22: In Vitro Test of mTOR Inhibition Induced by the HAS1-Oleylamide/Rapamycin Derivative The efficacy of the HAS1-oleylamide/rapamycin formulation as prepared in Example 10 in inhibiting mTOR was determined in vitro with an ELISA (K-Elisa mTOR Activity Kit Cat. No. CBA055; Merck) assay, using a rapamycin-free buffer solution (TRIS) as control and two different doses of rapamycin "as is", dissolved in DMSO. The doses are shown in the chart in FIG. 5 and for the sake of simplicity, in the case of the derivative, refer to the rapamycin concentration. The activity of mTOR in the absence of rapamycin was standardised to 100%. As expected, a concentration-dependent response to rapamycin was observed. The HAS1-oleylamide/rapamycin formulation proved active in inhibiting mTOR at much lower concentrations than rapamycin alone. Specifically, the inhibition obtained with a rapamycin concentration of 125 μM is achieved with the HAS1-oleylamide/rapamycin formulation containing 34.7 μM rapamycin, i.e. a much lower active ingredient content. Being able to administer significantly smaller amounts of medicament with the same effect would mean minimising or even eliminating the significant side effects that can be caused by rapamycin.

The invention claimed is:

1. Sulfated hyaluronic acid amides (HAS) with C4-C20 alkenylamines, wherein a molar degree of derivatization of the alkenylamine in the sulfated hyaluronic acid amide ranges from 2 to 20%.

2. Amides according to claim 1 wherein the sulfated hyaluronic acid has a number of sulfate groups per disaccharide unit ranging from 0.5 to 3.5.

3. Amides according to claim 2 wherein the sulfated hyaluronic acid has a number of sulfate groups per disaccharide unit ranging from 0.5 to 1.5.

4. Amides according to claim 2 wherein the sulfated hyaluronic acid has a number of sulfate groups per disaccharide unit ranging from 1.5 to 2.5.

5. Amides according to claim 2 wherein the sulfated hyaluronic acid has a number of sulfate groups per disaccharide unit ranging from 2.5 to 3.5.

6. Amides according to claim 1 wherein the alkenylamine is selected from oleylamine, (2E)-hex-2-en-1-amine and pent-2-en-1-amine.

7. Amides according to claim 6 wherein the alkenylamine is oleylamine.

8. Amides according to claim 1 wherein the molecular weight of the starting hyaluronic acid used for the sulfation ranges from 100,000 to 250,000 Da.

9. Amides according to claim 1 wherein the molecular weight of the starting hyaluronic acid used for the sulfation ranges from 500,000 to 730,000 Da.

10. Micellar suspensions comprising an aqueous micellar suspension of an amide and a hydrophobic or hydrophilic medicament, wherein the amide is the oleylamide of claim 7.

11. Micellar suspensions according to claim 10 wherein the oleylamide concentration is 13 mg/mL.

12. A process for the preparation of the micellar suspensions of claim 10, which comprises:
   reacting a C4-C20 alkenylamine with a benzalkonium or tetrabutylammonium salt of sulfated hyaluronic acid in an aprotic apolar solvent in the presence of condensing agents;
   mixing the sulfated hyaluronic acid amide obtained in the previous step with an aqueous solution or suspension of the medicament;
   sonication of the mixture and sterile filtration.

13. A method of stabilizing and controlling the release of a medicament, which comprises combining a medicament with the sulfated hyaluronic acid amides according to claim 1.

* * * * *